(No Model.)
J. F. GILLILAND.
COMBINED WASHER AND LINCHPIN.
No. 320,059. Patented June 16, 1885.
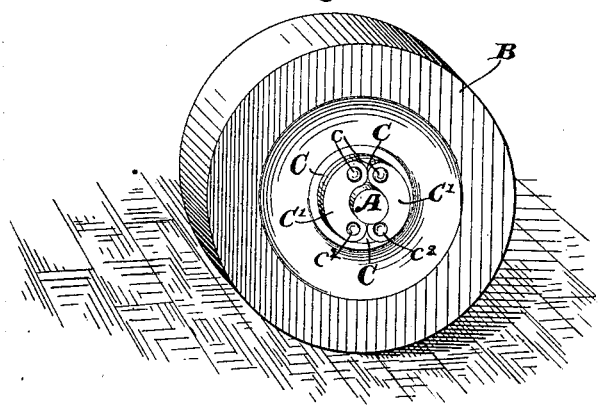
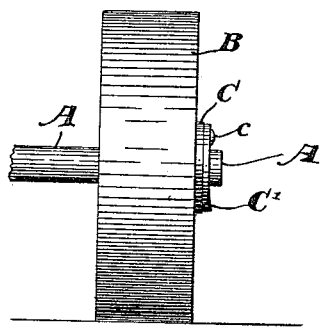
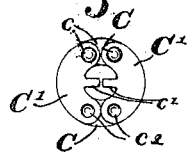
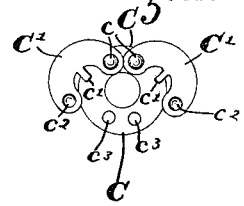
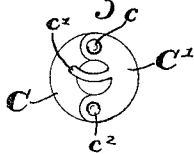
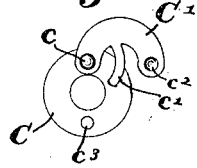
WITNESSES.
Chas. N. Leonard.
E. W. Bradford.
INVENTOR.
James F. Gilliland,
PER
C. Bradford,
ATTORNEY.
N. PETERS, Photo-Lithographer, Washington, D. C.

UNITED STATES PATENT OFFICE.

JAMES F. GILLILAND, OF INDIANAPOLIS, INDIANA.

COMBINED WASHER AND LINCHPIN.

SPECIFICATION forming part of Letters Patent No. 320,059, dated June 16, 1885.

Application filed March 27, 1885. (No model.)

*To all whom it may concern:*

Be it known that I, JAMES F. GILLILAND, of the city of Indianapolis, county of Marion, and State of Indiana, have invented certain new and useful Improvements in Combined Washers and Linchpins, of which the following is a specification.

My said invention consists in a combined washer and linchpin adapted to be placed on the end of a shaft pierced with a hole, the washer being an ordinary washer with a latch or latches pivoted thereto, having a tongue on each adapted to enter said hole in the shaft, and each latch having a projection on its free end adapted to enter a notch in the face of said washer and secure said latches in position, as will be presently more fully described.

Referring to the accompanying drawings, which are made a part hereof, and on which similar letters of reference indicate similar parts, Figure 1 is a perspective view of an axle and truck provided with my invention; Fig. 2, a side elevation of the same; Fig. 3, a plan view of my device separately, the latches being swung together as when in use; Fig. 4, a similar view, the latches being swung apart to enable the device to be placed upon or removed from the axle; Fig. 5, a similar view to Fig. 3, except that only a single latch is used, and Fig. 6, a view of the device as shown in Fig. 5 in a position corresponding to that shown in Fig. 4.

In said drawings, the portions marked A represent the axle or shaft; B, the truck or wheel, and C my improved device.

The axle A and truck B are not peculiar, and need no special description. Said axle, as before indicated, is provided with a hole, as is common where a linchpin is employed to hold the truck or wheel thereon.

The device C, as before indicated, is in the general form of a washer, and has a latch or latches, C', secured thereto by a pivot, $c$, said latch or latches being provided with a central projection or tongue, $c'$, which is adapted to enter the hole in the shaft or axle. A small projection, $c^2$, is formed on the free end of these latches, which engages with a corresponding notch or hole, $c^3$, in the body of the washer when the device is in use, thus holding it in position, said latch being preferably formed of spring metal to render this engagement effective.

This combined washer and linchpin may be used in many places; but I have designed it especially for use on roller-skates, for which use it is admirably adapted.

I am aware that ox-yoke bow-pins similar in general construction to the combined washer and linchpin shown herein have been devised. I do not therefore claim said general construction, broadly, but limit myself to the particular construction herein described and claimed.

Having thus fully described my said invention, what I claim as new, and desire to secure by Letters Patent, is—

The combined washer and linchpin, consisting of an ordinary washer, C, a latch or latches, C', secured thereto by pivots $c$, and provided with projections $c'$ and $c^2$, the former being adapted to engage with the hole in the axle and the latter with the hole or notch in the washer, substantially as described.

In witness whereof I have hereunto set my hand and seal, at Indianapolis, Indiana, this 23d day of March, A. D. 1885.

JAMES F. GILLILAND. [L. S.]

In presence of—
  E. W. BRADFORD,
  CHARLES L. THURBER.